US012269321B2

(12) United States Patent
Meda et al.

(10) Patent No.: US 12,269,321 B2
(45) Date of Patent: Apr. 8, 2025

(54) DEVICE FOR SUPPORTING A FRAME IN AN OPENING, A FRAME WITH SUCH A DEVICE, A WINDOW, A RECREATIONAL VEHICLE WITH SUCH A FRAME OR WINDOW AND METHOD FOR SUPPORTING THE FRAME OR THE WINDOW IN THE OPENING

(71) Applicant: Dometic Sweden AB, Solna (SE)

(72) Inventors: Samuele Meda, Chichester (GB); Rickard Hederstierna, Hägersten (SE)

(73) Assignee: Dometic Sweden AB, Solna (SE)

( * ) Notice: Subject to any disclaimer, the term of this patent is extended or adjusted under 35 U.S.C. 154(b) by 373 days.

(21) Appl. No.: 17/636,487

(22) PCT Filed: Aug. 4, 2020

(86) PCT No.: PCT/EP2020/071912
§ 371 (c)(1),
(2) Date: Feb. 18, 2022

(87) PCT Pub. No.: WO2021/032470
PCT Pub. Date: Feb. 25, 2021

(65) Prior Publication Data
US 2022/0274467 A1    Sep. 1, 2022

(30) Foreign Application Priority Data

Aug. 21, 2019   (DE) .......................... 102019212529.8

(51) Int. Cl.
*B60J 1/00*    (2006.01)
(52) U.S. Cl.
CPC ............... *B60J 1/007* (2013.01); *B60J 1/006* (2013.01); *E05Y 2600/502* (2013.01);
(Continued)

(58) Field of Classification Search
CPC ..... B60J 1/007; B60J 1/006; E05Y 2600/502; E05Y 2600/60; E05Y 2800/178; E05Y 2900/512; E05Y 2900/55
(Continued)

(56) References Cited

U.S. PATENT DOCUMENTS

| 2,066,705 A | 1/1937 | Vazquez |
| D105,027 S | 6/1937 | Moravek |

(Continued)

FOREIGN PATENT DOCUMENTS

| AT | 459777 T | 3/2010 |
| AT | 529599 T | 11/2011 |

(Continued)

OTHER PUBLICATIONS

European Patent Office, International Search Report and Written Opinion for app. No. PCT/EP2020/071912 mailed Nov. 19, 2020, 10 pages.

(Continued)

*Primary Examiner* — Amy R Weisberg
*Assistant Examiner* — Dana D Ivey
(74) *Attorney, Agent, or Firm* — Dinsmore & Shohl LLP

(57) ABSTRACT

The present invention refers to a device for supporting a frame in an opening, in particular in a wall opening of a recreational vehicle, like a motor home or a caravan. The device according to the present invention is configured in such a way, that the frame is attached to the wall via one single rotational movement of one component of the device. Furthermore, the present invention refers to a corresponding frame, a corresponding window, a recreational vehicle with such a frame or window and corresponding methods.

12 Claims, 6 Drawing Sheets

(52) U.S. Cl.
CPC ..... *E05Y 2600/60* (2013.01); *E05Y 2800/178* (2013.01); *E05Y 2900/512* (2013.01); *E05Y 2900/55* (2013.01)

(58) Field of Classification Search
USPC .............................................. 296/146.16, 152
See application file for complete search history.

(56) References Cited

U.S. PATENT DOCUMENTS

| | | | |
|---|---|---|---|
| 2,256,548 | A | 9/1941 | Chaffee |
| 2,767,979 | A | 10/1956 | Hummert |
| D206,530 | S | 12/1966 | Zell |
| 4,180,117 | A | 12/1979 | Greer |
| 4,392,329 | A | 7/1983 | Suzuki |
| 4,793,099 | A | 12/1988 | Friese et al. |
| 5,142,834 | A | 9/1992 | Laclave et al. |
| 5,581,943 | A | 12/1996 | Deren et al. |
| 5,735,089 | A | 4/1998 | Smith et al. |
| 5,787,643 | A | 8/1998 | Schmuck |
| 5,941,022 | A | 8/1999 | Schmuck |
| 6,006,473 | A | 12/1999 | Mariel et al. |
| 6,021,834 | A | 2/2000 | Malott |
| 6,021,835 | A | 2/2000 | Malott |
| 6,135,511 | A | 10/2000 | Smith et al. |
| 6,263,627 | B1 | 7/2001 | Schoenebach et al. |
| 6,588,819 | B1 | 7/2003 | Block |
| 7,024,822 | B2 | 4/2006 | Scheer et al. |
| D554,031 | S | 10/2007 | Eskandry |
| D558,652 | S | 1/2008 | Davis |
| 8,091,948 | B2 | 1/2012 | Smith et al. |
| 8,322,091 | B2 | 12/2012 | Smith et al. |
| 8,327,603 | B2 | 12/2012 | Smith |
| 8,776,435 | B2 * | 7/2014 | Hulst .................... E05F 11/382 49/128 |
| D735,628 | S | 8/2015 | Eskandry |
| D741,084 | S | 10/2015 | Stankus |
| D743,183 | S | 11/2015 | Nye |
| D756,868 | S | 5/2016 | Shu |
| D767,304 | S | 9/2016 | Nye |
| 9,499,030 | B1 | 11/2016 | Gong |
| D791,656 | S | 7/2017 | Nguyen |
| D793,308 | S | 8/2017 | Lewis |
| D801,244 | S | 10/2017 | Shu |
| D809,159 | S | 1/2018 | Alexander |
| D813,767 | S | 3/2018 | Mulokandov |
| 10,683,038 | B2 | 6/2020 | Fleckenstein et al. |
| D895,494 | S | 9/2020 | BerTrand |
| 10,814,763 | B2 * | 10/2020 | Cramer ................. B60N 3/026 |
| D904,949 | S | 12/2020 | Rago |
| D910,515 | S | 2/2021 | Patel |
| D920,198 | S | 5/2021 | Jia et al. |
| D941,202 | S | 1/2022 | Nash et al. |
| D952,530 | S | 5/2022 | Li |
| 2003/0107221 | A1 | 6/2003 | Kobrehel |
| 2004/0083678 | A1 | 5/2004 | Tumlin et al. |
| 2005/0072532 | A1 | 4/2005 | Holden et al. |
| 2006/0021290 | A1 | 2/2006 | Kobrehel et al. |
| 2006/0260203 | A1 | 11/2006 | Wong et al. |
| 2007/0245517 | A1 | 10/2007 | Kiefer et al. |
| 2009/0091154 | A1 | 4/2009 | Gong |
| 2009/0160220 | A1 * | 6/2009 | Elijah .................... B60J 5/0487 277/650 |
| 2009/0250974 | A1 | 10/2009 | Albert et al. |
| 2011/0017412 | A1 | 1/2011 | MacNeil |
| 2012/0073770 | A1 | 3/2012 | Zheng |
| 2014/0245556 | A1 | 9/2014 | Kaminer et al. |
| 2015/0101768 | A1 | 4/2015 | Lee |
| 2018/0357871 | A1 | 12/2018 | Siminoff |
| 2019/0061829 | A1 | 2/2019 | Fleckenstein et al. |
| 2020/0149334 | A1 | 5/2020 | Lundqvist et al. |
| 2021/0188056 | A1 | 6/2021 | Dillhage |
| 2021/0188057 | A1 | 6/2021 | Dillhage |
| 2021/0188058 | A1 | 6/2021 | Dillhage |
| 2022/0274467 | A1 | 9/2022 | Meda et al. |
| 2022/0297512 | A1 | 9/2022 | Meda et al. |

FOREIGN PATENT DOCUMENTS

| | | | | |
|---|---|---|---|---|
| AU | 362564 | S | 7/2015 | |
| AU | 362565 | S | 7/2015 | |
| AU | 2014256378 | A1 | 5/2016 | |
| AU | 2015201787 | A1 | 10/2016 | |
| AU | 2018217330 | A1 | 3/2019 | |
| AU | 202010969 | S | 3/2020 | |
| AU | 202010970 | S | 3/2020 | |
| AU | 202010973 | S | 3/2020 | |
| AU | 2020332703 | A1 | 3/2022 | |
| AU | 2020334121 | A1 | 3/2022 | |
| CA | 2635065 | A1 | 10/2009 | |
| CN | 114340926 | A | 4/2022 | |
| CN | 216866539 | U | 7/2022 | |
| CN | 216894201 | U | 7/2022 | |
| CN | 216974705 | U | 7/2022 | |
| DE | 4009348 | A | * 9/1991 | ................ B60J 1/10 |
| DE | 4009348 | A1 | 9/1991 | |
| DE | 3780499 | T2 | 3/1993 | |
| DE | 19725677 | A1 | 12/1998 | |
| DE | 29715579 | U1 | 2/1999 | |
| DE | 29818045 | U1 | 2/1999 | |
| DE | 29903324 | U1 | 5/1999 | |
| DE | 29902888 | U1 | 7/1999 | |
| DE | 20005246 | U1 | 10/2000 | |
| DE | 20009267 | U1 | 10/2001 | |
| DE | 20306085 | U1 | 7/2003 | |
| DE | 10335276 | A1 | 3/2005 | |
| DE | 202006001352 | U1 | 3/2006 | |
| DE | 102008033417 | A1 | 1/2010 | |
| DE | 502004010836 | | 1/2010 | |
| DE | 102008044891 | A1 | 7/2010 | |
| DE | 102009019888 | B4 | 2/2015 | |
| DE | 202017106376 | U1 | 10/2017 | |
| DE | 102016124327 | A1 | 6/2018 | |
| DE | 102018105800 | A1 | 9/2018 | |
| DE | 102017206449 | A1 | 10/2018 | |
| DE | 102017214863 | A1 | 10/2018 | |
| DE | 102018205680 | A1 | 10/2018 | |
| DE | 102019204525 | A1 | 10/2020 | |
| DE | 102019212527 | A1 | 2/2021 | |
| DE | 102019212529 | A1 | 2/2021 | |
| DE | 102019220488 | A1 | 6/2021 | |
| DE | 102019220490 | A1 | 6/2021 | |
| DE | 102019220491 | A1 | 6/2021 | |
| DE | 102019205795 | B4 | 3/2022 | |
| DE | 202018006765 | U1 | 11/2022 | |
| DK | 1503023 | T3 | 5/2010 | |
| EM | 006745642-0001 | | 8/2019 | |
| EM | 006745642-0002 | | 8/2019 | |
| EM | 006745642-0003 | | 8/2019 | |
| EM | 006745642-0004 | | 8/2019 | |
| EP | 1503023 | A2 | 2/2005 | |
| EP | 1574646 | A1 | 9/2005 | |
| EP | 1813750 | A2 | 8/2007 | |
| EP | 2159357 | A2 | 3/2010 | |
| EP | 2733301 | A2 | 5/2014 | |
| EP | 4013633 | A1 | 6/2022 | |
| EP | 4018062 | A1 | 6/2022 | |
| ES | 2342165 | T3 | 7/2010 | |
| FR | 2676402 | A1 | 11/1992 | |
| GB | 1499831 | A | 2/1978 | |
| GB | 2161201 | A | 1/1986 | |
| WO | 2019093896 | A2 | 5/2019 | |
| WO | 2021032424 | A1 | 2/2021 | |
| WO | 2021032470 | A1 | 2/2021 | |

OTHER PUBLICATIONS

Office action DE Patent Application No. 1020192125298 mailed on Sep. 9, 2022.
EP Patent Application No. 20754689.6 titled "Device for Supporting a Frame in an Opening, a Frame With Such a Device, a Window, a Recreational Vehicle With Such a Frame or Window and Method for Supporting the Frame or the Window in the Opening" filed on Aug. 4, 2020.

(56) References Cited

OTHER PUBLICATIONS

CN Patent Application No. 202080059021.4 titled "Device for Supporting a Frame in an Opening, a Frame With Such a Device, a Window, a Recreational Vehicle With Such a Frame or Window and Method for Supporting the Frame or the Window in the Opening" filed on Feb. 21, 2022.
CN Patent Application No. 202080059013.X titled "Window, Recreational Vehicle With the Window and Methods for Manufacturing and Operating the Window" filed on Feb. 21, 2022.
EP Patent Application No. 20750622.1 titled "Window, Recreational Vehicle With the Window and Methods for Manufacturing and Operating the Window" filed on Jul. 29, 2020.
U.S. Appl. No. 29/867,842 titled "U.S. Appl. No. 29/867,842", filed Nov. 10, 2022.
Office action DE Patent Application No. 1020192125271 mailed on Dec. 2, 2022.
Australian Patent Application No. 202010970 titled "Extendible window for a recreational vehicle" filed on Feb. 20, 2020.
Australian Patent Application No. 202010973 titled "Extendible window for a recreational vehicle" filed on Feb. 20, 2020.
Australian Patent Application No. 202010969 titled "Extendible window for a recreational vehicle" filed on Feb. 20, 2020.
Australian Patent Application No. 2020334121 titled "I-LUX RV Window Fixation" filed on Feb. 21, 2022.
Australian Patent Application No. 2020332703 titled "I-LUX window opening and closing mechanism" filed on Feb. 21, 2022.
German Patent Application No. 1020192125298 titled "Device for Supporting a Frame in an Opening, a Frame with Such a Device, a Window, a Recreational Vehicle with Such a Frame or Window and Method for Supporting the Frame or the Window in the Opening" filed on Aug. 21, 2019.
German Patent Application No. 1020192125271 titled "Window, Recreational Vehicle with the Window and Methods for Manufacturing and Operating the Window" filed on Aug. 21, 2019.
European Union Application No. 006745642-0001-0004 titled "I-LUX Window frameless window" filed on Aug. 21, 2019.
Examination Report Issued in German Patent Application No. 1020192125298 mailed on Mar. 12, 2020.
International Search Report Issued in PCT Application No. PCT/EP2020/071352 mailed on Nov. 10, 2020.
Notice of Allowance Issued in U.S. Appl. No. 29/724,878 mailed on Sep. 21, 2021.
Notice of Allowance Issued in U.S. Appl. No. 29/724,878 mailed on Feb. 16, 2022.
Office Action Issued in German Patent Application No. 1020192125271 mailed on Oct. 14, 2019.
Office Action Issued in German Patent Application No. 1020192125271 mailed on May 26, 2020.
PCT Application No. PCT/EP2020/071352 titled "Window, Recreational Vehicle With the Window and Methods for Manufacturing and Operating the Window" filed on Jul. 29, 2020.
U.S. Appl. No. 17/636,490 titled "Window, Recreational Vehicle with the Window and Methods for Manufacturing and Operating the Window" filed on Feb. 18, 2022.
U.S. Appl. No. 29/724,878, titled "Window" filed on Feb. 20, 2020.
Notice of Allowance Issued in U.S. Appl. No. 29/724,878 mailed on Jul. 6, 2022.
Non-Final Office Action issued in U.S. Appl. No. 17/636,490 mailed on Apr. 4, 2023.
Office Action issued in EP Application No. 20750622.1 mailed on Jul. 4, 2023.
Notice of Allowance issued in U.S. Appl. No. 29/867,842 mailed on Mar. 22, 2024.
Non-Final Office Action issued in U.S. Appl. No. 17/636,490 mailed on May 13, 2024.
Office Action issued in EP Application No. 20754689.6 mailed on May 16, 2024.
Australian Design Application No. 202317866 titled "Window for vehicles" filed on Nov. 27, 2023.
Australian Design Application No. 202317867 titled "Window for vehicles" filed on Nov. 27, 2023.
EU Design Application No. 015024206-0001-015024206-0002 titled "Window for vehicles" filed on Jun. 9, 2023.
Notification of Registration issued in EU Design Application No. 015024206-0001-015024206-0002 mailed on Jun. 21, 2023.
Certificate of Registration issued in EU Design Application No. 015024206-0001 mailed on Jun. 9, 2023.
Certificate of Registration issued in EU Design Application No. 015024206-0002 mailed on Jun. 9, 2023.
U.S. Appl. No. 29/919,794, titled "Window Assembly" filed on Dec. 6, 2023.
Registration Certificate issued in AU Application No. 202317866 mailed on Jan. 14, 2024.
Registration Certificate issued in AU Application No. 202317867 mailed on Jan. 14, 2024.
Final Office Action issued in U.S. Appl. No. 17/636,490 mailed on Jan. 8, 2024.

\* cited by examiner

DEVICE FOR SUPPORTING A FRAME IN AN OPENING, A FRAME WITH SUCH A DEVICE, A WINDOW, A RECREATIONAL VEHICLE WITH SUCH A FRAME OR WINDOW AND METHOD FOR SUPPORTING THE FRAME OR THE WINDOW IN THE OPENING

CLAIM TO PRIORITY

This 35 U.S.C. § 371 National Stage Patent Application claims priority to PCT Patent Application No. PCT/EP2020/071912, filed Aug. 4, 2020, and titled "Device for Supporting a Frame in an Opening, a Frame with Such a Device, a Window, a Recreational Vehicle with Such a Frame or Window and Method for Supporting the Frame or the Window in the Opening" which claims priority to and benefit of German Patent Application Serial Number DE 102019212529.8 filed Aug. 21, 2019, all of which is incorporated by reference herein.

BACKGROUND

The present embodiments refer to a device for supporting a frame in an opening, a frame with such a device, a corresponding window, a recreational vehicle with such a frame or window and methods for supporting the frame or the window in the opening.

In general, devices for supporting a frame, in particular a frame for a window, in an opening, for example like in a window opening, of a recreational vehicle, for example like of a motor home or of a caravan, are provided as supporting brackets configured to support the corresponding frame to the opening.

These known supporting brackets are quite reliable for supporting a frame in an opening in a safe and stable manner. However, for each distinct wall thickness of the recreational vehicle a special, individualized supporting bracket with a corresponding size/height has to be designed and provided for supporting the frame in the wall opening. In consequence, each particular supporting bracket only can be used for a distinct wall thickness determined by its size/height.

This results in increased production costs, as each supporting bracket has to be produced custom made for each application, as the thicknesses of different walls differ from each other generally. In addition, the installation and/or replacement of the supporting brackets requires special attention such that not the wrong bracket is installed. Installing a wrong bracket likely would result in an inappropriate support of the frame in the opening and thus the risk that the frame detaches itself from the wall, in particular when wall is shook for example due to a movement of the respective recreational vehicle. Moreover, during the lifetime of the brackets they are widened due to material fatigue, resulting in the necessity to replace them to ensure the reliable supporting of the frame. Finally, the installation of the known brackets can be quite burdensome as they have to be coupled to the frame and the wall one by one manually while holding the frame in the opening. Hence, the consumption of manpower and time is relatively high.

Accordingly, the problem to be solved by the present embodiments is to provide a device for easily and reliably supporting a frame in a corresponding opening in a wall or a roof for a broad range of wall thicknesses, further having an increased lifetime as compared to the known brackets.

Besides, there is a demand for a corresponding frame, a window with such a frame, a recreational vehicle with such a frame and/or window and corresponding methods for use thereof.

The above problems are solved by the subject matter of independent claims. Further advantageous features for the corresponding subject matters are provided in the dependent claims.

SUMMARY

According to a first aspect, the device for supporting a frame in an opening, in particular in a wall opening of a recreational vehicle, such as a motor home or a caravan, may comprise a guiding body configured to be attached to the frame, a clamping body having a tubular coupling portion and a clamping portion and a fixing member having a threaded portion and a head portion. The guiding body has a receiving region in which the coupling portion of the clamping body is inserted such that the coupling portion is movable along a longitudinal axis of the coupling portion between a first position and a second position relative to the guiding body. In addition, the coupling portion of the clamping body may be rotatable about the longitudinal axis of the coupling portion relative to the guiding body. The guiding body may have at least one stop which limits the rotation of the coupling portion about its longitudinal axis relative to the guiding body. The fixing member may engage via its threaded portion into a counter element provided in the guiding body so as to be screwable in and out. The fixing member may be connected to the guiding body in such a way that the head portion of the fixing member limits the movement of the coupling portion of the clamping body along the longitudinal axis of the coupling portion relative to the guiding body. In a first locking position relative to the guiding body the fixing member restricts the movement of the coupling portion along its longitudinal axis to a range between the first position and the second position. In a second locking position the fixing member forces the coupling portion into the second position.

The concrete position of the fixing member with respect to the guiding body can be adjusted by screwing in and/or out the threaded portion of the fixing member in and/or out of the provided counter element of the guiding body. This for example can be done using an appropriate tool like for example a screw driver or a similar tool, the tool engaging a correspondingly provided engaging region provided on/at the head portion of the fixing member. The coupling portion of the clamping body may be locked between the head portion of the fixing member and a corresponding abutment surface provided on the guiding body. Via moving the fixing member from the first locking position to the second locking position relative to the guiding member, the relative position of the coupling member of the clamping member and thus of the whole clamping member along the longitudinal axis of the coupling portion of the clamping body with respect to the guiding body is limited or fixed, respectively. Moving the fixing member from the first locking position to the second locking position in particular is achieved by screwing the threaded portion of the fixing member into the counter element of the guiding body. Besides, the provided stop limits the rotational movement of the coupling portion and thus of the coupling body around the longitudinal axis of the coupling portion of the clamping body relative to the guiding body. A longitudinal axis of the fixing member corresponds to the longitudinal axis of the coupling portion. This configuration allows a fast and easy installation of the frame to the corresponding opening by simply screwing the fixing member into the provided counter element of the guiding body. This screwing at first results in a rotation of the coupling portion and thus of the clamping body about the longitudinal axis of the coupling portion. Thus, this screwing results in rotating the clamping portion of the clamping body from a first orientation, in which the clamping portion is misaligned with the edges of the wall around the opening seen along the longitudinal axis of the coupling portion to a second orientation in which the clamping portion at least partly is aligned with the edges of the wall around the opening seen along the longitudinal axis of the coupling portion. In the second orientation of the clamping body with respect to the guiding body, the stop of the guiding body interacts with the clamping body to block the further rotation of the clamping body. Then proceeding with screwing the fixing member into the counter element of the guiding body only results in the coupling portion and thus the clamping body with the clamping portion moving long the longitudinal axis with respect to the guiding body and thus biasing the coupling portion towards the second position. Therewith, it is possible to clamp the edges of the wall around the opening between the clamping portion of the clamping body and a correspondingly provided counter surface on the frame, when the device is attached to the frame in an appropriate manner. Thus, the frame is reliably supported in the opening. The particular insertion depth of the threaded portion of the fixing member into the counter element, in which the frame is supported appropriately is dependent on the thickness of the wall and the desired clamping force. Accordingly, the device for supporting the frame in an opening is suitable for many different wall thicknesses. In addition, when the clamping force has reduced over a specific period of use, for example due to material fatigue, there is no need of replacing the device to restore the original clamping force. In such a case it is sufficient just to tighten the fixing member. Moreover, the installation of the device/frame is easy and efficient in time and effort, as the concrete alignment of the clamping body and the clamping requires only one screw-in movement.

The clamping body may further comprise a limiting projection which interacts with a further stop formed on the guiding body such that the clamping body is guided longitudinally along the guiding body when moving along the longitudinal axis of the coupling portion and by that any rotation of the coupling portion relative to the guiding body is blocked during the movement of the clamping body along the longitudinal axis of the coupling portion.

With such a configuration, during the longitudinal movement of the clamping body with respect to the guiding body after the further rotation is blocked by the stop, with the implemented longitudinal guidance of the clamping body, an undesired rotating back of the clamping body with respect to the guiding body is prevented reliably. Thus, the correct supporting of the frame on the wall is guaranteed. Moreover, the further stop results in that during detaching the device/frame from the opening with a corresponding screw-out movement of the fixing member, at first a complete release of the clamping body from the wall is achieved before the clamping body can rotate from the second orientation back to the first orientation, and avoiding damage to the wall, to the frame and to the device resulting from an erroneous detaching. The further stop can be formed independently from or along with the stop, such that the stop and the further stop form one common stop, the stop mentioned above.

Further, the further stop may be formed as a recess in the guiding body and the further stop is designed to receive the limiting projection of the clamping body.

This configuration is a quite simple but at the same time reliable possibility of ensuring the above functionality of the further stop together with the limiting projection.

The clamping body, in particular at its clamping portion, may have at least one fastening element which is designed in such a way that another frame and/or a window pane can be fastened via the fastening element to the device. This is realized in one example via a snap fit between the fastening element and at least one corresponding snap-in element provided on the other frame and/or on the window pane.

Such fastening elements allow to couple the further frame and/or the window pane to the frame and thus also to the opening in an easy and reliable manner. With this configuration, it is possible to attach a window into the opening by at first supporting the frame to the wall and then coupling the other frame and/or the window pane to the device and thus to the frame. The further frame and/or the window pane then advantageously covers the devices for supporting, resulting in an improved and clean appearance. A snap fit configuration is a quite simple and reliable implementation for achieving the above functionality.

The device may further comprise a biasing member, for example in form of a spring. The biasing member biases the clamping body towards the head portion of the fixing member such that the clamping body always rests against the head portion of the fixing member.

This configuration results in direct coupling of the movement of the clamping body with the movement of the fixing member preventing uncontrolled bouncing back and forth of the clamping body. This configuration thus prevents therewith associated damage to the device and/or inconveniences in handling the device.

According to another aspect, a frame, in particular for/of a window for a recreational vehicle, such as for example a motor home or a caravan, has at least two, in particular at least four and in some examples 20, devices according to the present invention and as described above and at least one corresponding counter surface. The devices are fixed to the frame in such a way that by screwing the fixing members into the corresponding counter elements the wall at the edges around the wall opening can be/is clamped between the clamping portions of the device and the counter surface formed on the frame, so as to support the frame to the wall.

Such a frame can be supported to the wall around a corresponding opening easily with the above described method with only one single screw-in movement.

The guiding body of at least one of the devices, in particular the guiding bodies of all of the devices, and the frame may be formed integrally and/or the guiding body of at least one of the devices, in particular the guiding bodies of all of the provided devices, is/are fastened to the frame via separate fastenings.

According to the first advantageous configuration, according to which the devices are formed integrally with the frame, the necessary devices are not provided as independent component being independent from the frame. This results in a more simplified production process as well as a facilitated handling for the overall configuration.

According to the second advantageous configuration, the devices for example can be provided with screw holes via which the devices can be screwed onto the frame. Although this configuration requires a further step for supporting the frame to the opening, such a configuration is more flexible, as the devices can be coupled to the frame at various positions along the frame.

In some embodiments, the frame is an adapter frame configured to support a window pane and/or another frame in an opening, in particular in a window opening in a wall of a recreational vehicle, such as a motor home or a caravan. In particular, the frame comprises at least one fastening element adapted so that the other frame and/or the window pane can be fastened thereto, in particular via snap fit between the a least one fastening element and at least one corresponding snap-in element provided on the other frame and/or on the window pane.

As already indicated above, such a configuration results in a facilitated installation procedure for the other frame and/or the window while allowing an improved overall appearance.

The frame may have at least one receiving section in which an extendable sunshield or other functional element is/are or at least can be provided.

This configuration allows a very easy adaption of the frame to concrete demands of a customer.

According to another aspect, a window, in particular a window for a recreational vehicle, such as a motor home or a caravan, comprises at least one of the above described frames.

Thus, the above described advantages of the frame and/or of the provided devices can be achieved for the window.

According to another aspect, a recreational vehicle, such as a motor home or caravan, comprises at least one frame as described above and/or a least one window as described above.

Such a configuration allows to benefit from the above described advantages in/for a recreational vehicle.

According to another aspect, a method for supporting a frame in an opening, in particular in a wall opening of a recreational vehicle, such as a motor home or a caravan, may comprise the steps of positioning the frame in the opening and aligning as well as tightening at least one provided device for supporting the frame in the opening with one single rotational movement of at least one component of the provided device(s), such that the edges of the wall around the opening are clamped between the device(s) and the frame.

This method depicts an easy way of supporting the frame in the opening, as only one single rotational movements (per provided device) is necessary, in particular reflecting the core idea of the present invention.

At least one of the provided devices corresponds to one of the above described devices. Then, in particular the aligning and tightening consists of screwing the fixing member(s) of the provided device(s) into the corresponding counter element(s) of the guiding body/bodies so as to clamp the wall at the edges of the wall opening between the clamping portion(s) of the clamping body/bodies and a counter surface(s) provided on the frame.

This method is a quite simple way for supporting a frame to a wall with a corresponding opening.

The screwing comprises screwing in the fixing members from the preset first locking position to the second locking position only to such a depth that the wall is clamped at the edges of the wall opening with the desired force.

Thus, it is possible to set the concrete clamping force with which the frame is supported to the wall as well as to readjust the concrete value of the clamping force (in particular after the clamping force has been reduced due to material fatigue) anytime quite easily.

According to another aspect, a method for mounting a window into a wall opening, in particular into a wall opening in a recreational vehicle, such as a motor home or a caravan, comprises one of the above described methods and the step of fastening the window pane and/or another frame to the frame.

This method results in a very easy installation of the window in the corresponding opening and an attractive and clear overall appearance of the installed window.

The fastening is effected via a snap fit between corresponding fastening elements provided on the frame and/or on the device, and corresponding snap-in elements provided on the other frame and/or on the window pane.

The snap-fit configuration is a structurally well known, simple and reliable possibility for fastening the other frame and/or the window pane to the frame.

BRIEF DESCRIPTION OF THE DRAWINGS

A more complete appreciation of the embodiments and many of the attendant advantages thereof will be readily obtained as the same becomes better understood by reference to the following detailed description when considered in connection with the accompanying drawings, wherein.

DETAILED DESCRIPTION

Figure 1A:
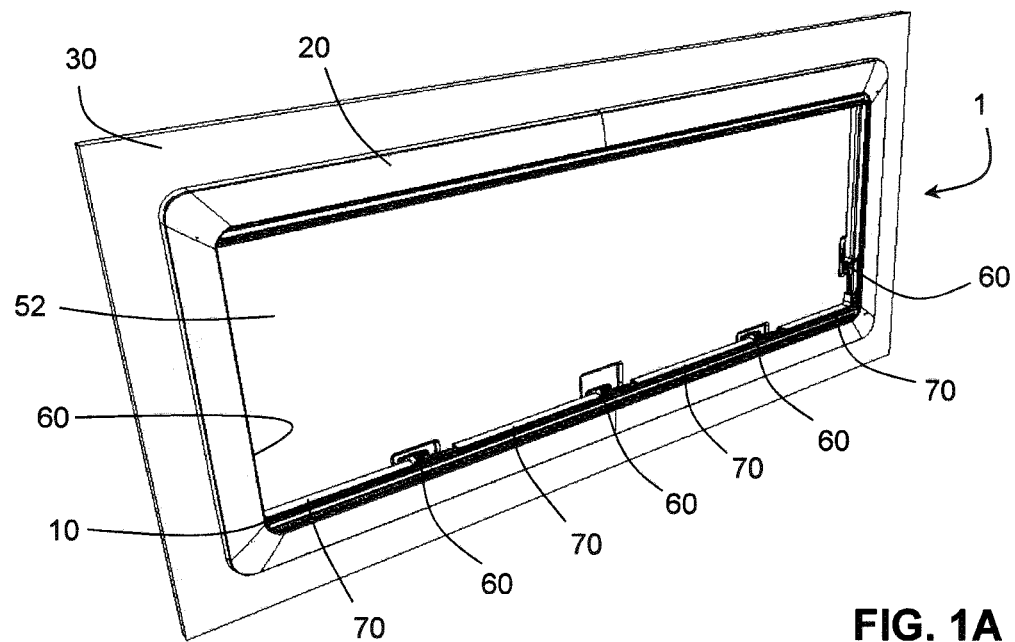
FIGS. 1A and 1B are a spatial views of a window coupled via devices to a corresponding opening in a wall, for example in a wall of a recreational vehicle.

Selected embodiments will now be described with reference to the accompanying drawings, wherein like reference numerals designate corresponding or identical elements throughout the various drawings.

In the accompanying figures, several different views of a window, a corresponding frame and a device are illustrated. However, also other implementations are accessible to the skilled artisan from this disclosure, without departing from the scope of protection of the present invention.

Figure 1B:
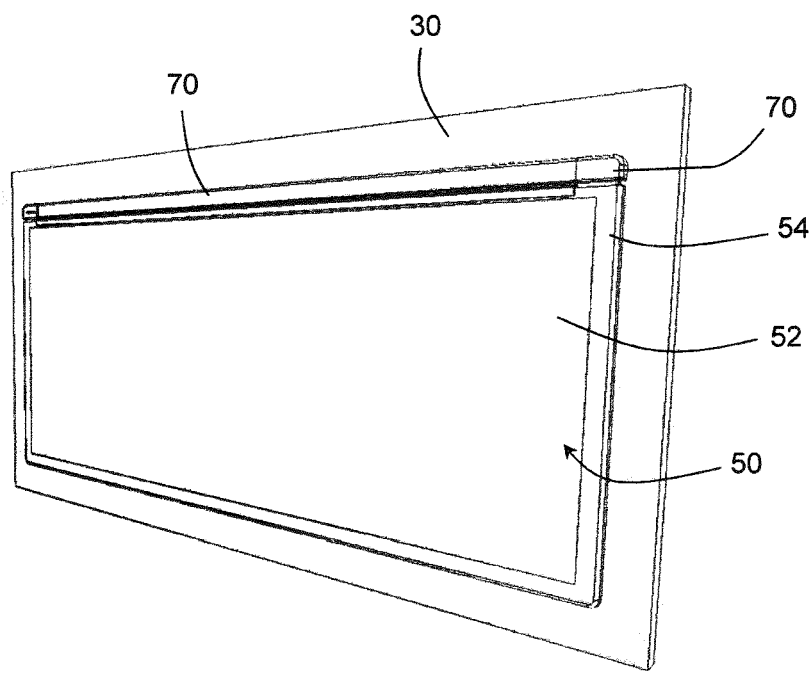
Figure 2A:
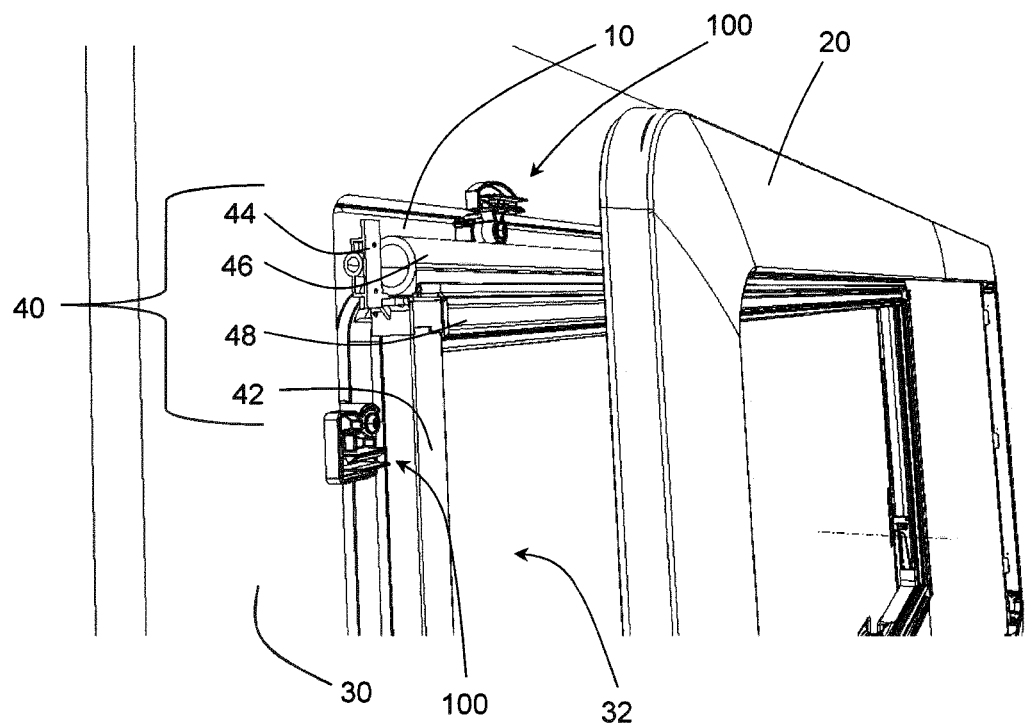
FIGS. 2A and 2B are enlarged spatial views of the upper left corner of the window of FIGS. 1A and 1B in a state in which in inner frame is detached from the outer frame.
Figure 2B:
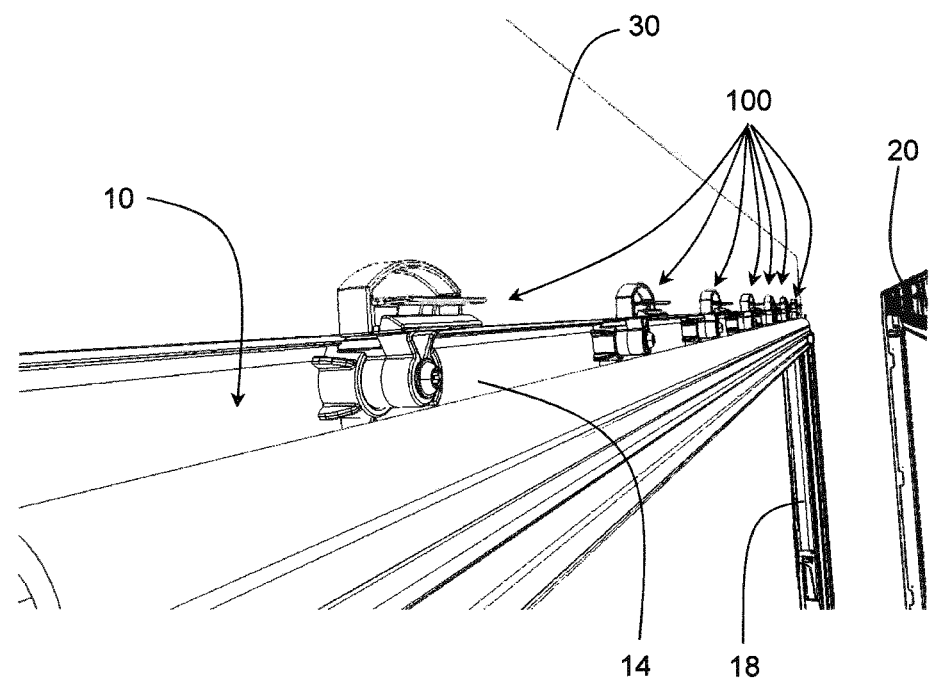

As in particular illustrated in FIGS. 1 to 2B, a window 1 has an outer frame 10 (frame), an inner frame 20 (another frame), a window pane 50 and several devices 100 for supporting the outer frame 10, and thus all components of the window 1, in an opening 32, in particular in a wall opening 32 provided in a wall 30 of a recreational vehicle. Exemplary embodiments of such a recreational vehicle are for example motor homes or caravans, but also several variants of recreational boats.

In the illustrated embodiment, an extendable sunshield 40 is provided within a corresponding receiving section provided in the outer frame 10. Various implementations of such extendable sunshields are well known to the skilled artisan and, thus, shall not be described in detail hereinafter.

In the illustrated embodiment, the extendable sunshield 40 comprises a guiding frame 42, several coupling members 44, a blackout fabric 46 and a handle rail 48. The guiding frame 42 is coupled via the coupling members 44 to the inner frame 20. The blackout fabric 46 is provided on a fabric roll coupled rotatably to the guiding frame 42. The handle rail 48 is connected to one end of the blackout fabric 46 and coupled slidably to the guiding frame 42. Thus, by moving the handle rail 48 along the guiding frame 42, the blackout fabric 46 is moved between a retracted configuration, in which the blackout fabric 46 is rolled-up completely onto the fabric roll, and an extended configuration, in which the blackout fabric 46 is mostly unrolled from the fabric roll. Such the blackout fabric 46 is covering the opening within the guiding frame 42. To ensure an appropriate rolling up of the blackout fabric 46 onto the fabric roll, a spring element (not illustrated) biasing the fabric roll into a rotational orientation in which the blackout fabric 46 is rolled-up completely on the fabric roll is provided.

As indicated above, also various other configurations for the extendable sunshield 40 are possible. For example, the extendable sunshield 40 can be coupled with the coupling members 44 directly to the outer frame 10. Furthermore, the guiding frame 42 can be replaced by latching elements configured to hold the handle rail 48 at various positions with respect to the fabric roll.

Furthermore, in the illustrated embodiment, a window pane 50 is attached to the outer frame 10 via correspondingly provided fastening elements 19. The window pane 50 has at least one glass plate 52, in particular two or even three distinct glass plates, being coupled via a window frame 54 to the outer frame 10 to cover the opening provided in the outer frame 10. Here, the window pane 50 is coupled to the outer frame 10 to be pivotable about the upper cross bar 14 of the outer frame 10 such that the window pane 50 can be moved between a closed configuration (as illustrated here), in which the window pane 50 seals the opening in the outer frame 10 (i.e. the window pane lies directly on the outer frame 10), and an opened configuration, in which the window pane 50 protrudes from the extension plane of the outer frame 10 in an angle greater 0° such that the opening in the outer frame 10 is not completely closed. Of course, also many other implementations are at the skilled artisans' disposal. For example, the window pane 50 also can be coupled to the inner frame 20 or the window pane 50 can be coupled in a non-movable (i.e. in particular in a non-pivotable) manner to the frames 10 and/or 20.

Although, in the illustrated embodiments the corresponding devices 100, the extendable sunshield 40 and the window panel 50 are provided on the outer frame 10, of course also all of these components or at least some of them can be provided on the inner frame 20.

Due to the fact that in the illustrated embodiment, a movable configuration for the window pane 50 is provided, the window 1 further comprises at least one operating and/or locking member 60. In the present embodiment, five operating and/or locking members 60 in the form of distinct lever elements coupled to the window pane 50 are provided. These operating and/or locking members 60 are configured to rotate about corresponding rotational axes between a locked position and an unlocked position, the axes being perpendicular with respect to the extension plane of the window pane 50. The operating and/or locking members 60 are configured to engage in the locked position with correspondingly provided engagement members (not illustrated explicitly) provided on the outer frame 10. Thus, the operating and/or locking members 60 block a pivotal movement of the window pane 50 from the closed configuration towards an opened configuration. Moreover, the operating and/or locking members 60 are configured to disengage from the corresponding engagement members in the unlocked position, thus, allowing a pivotal movement of the window pane 50 from the closed configuration towards the opened configuration, in particular by pushing or pulling the operating and/or locking members 60 along their rotational axes. Although the here described configuration has proved to be suitable, the skilled artisan has several other possibilities to achieve the therewith realized function(s). For example, less or even more than five operating and/or locking members 60 can be provided or the concrete spatial distribution of the operating and/or locking members 60 can be implemented. In addition, also completely different implementations for the operating and/or locking members 60 (with regard to their structure and/or function) can be provided.

Figure 3:
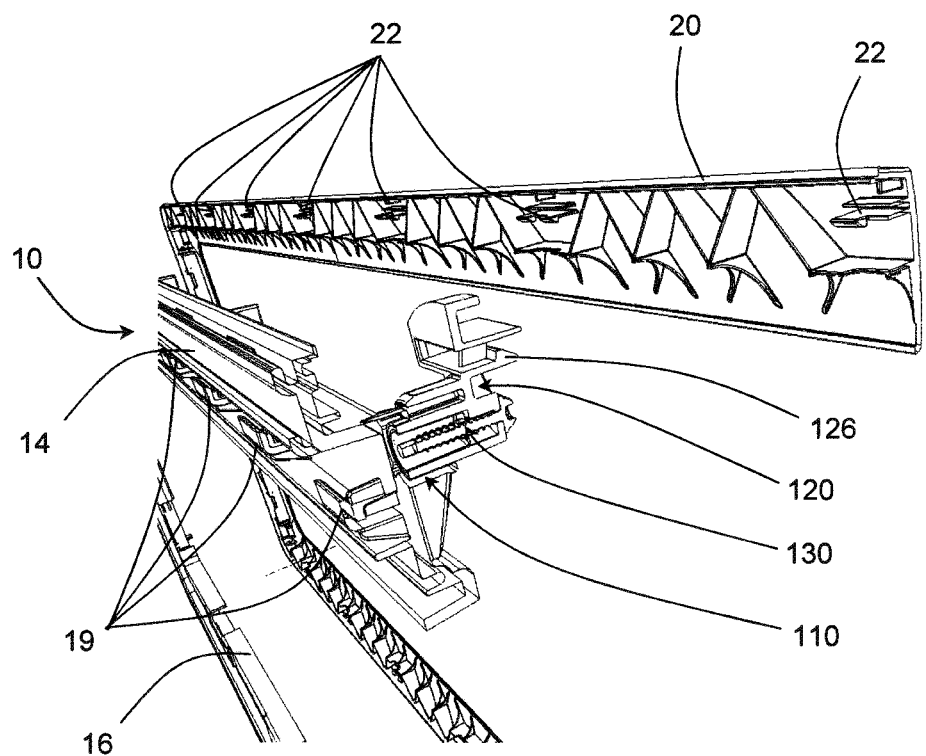
FIG. 3 is a spatial cross-section view of detached window of FIGS. 1 to 2B.

As illustrated in FIGS. 2A and 2B, the outer frame 10 is supported to the wall 30 along an edge of the wall opening 32 by clamping the wall 30 along the edge of the wall opening 32 between the provided devices 100 and a counter surface 12 or several counter surfaces of the outer frame 10 (see FIG. 3). The inner frame 20 is coupled with snap-in elements 22 to the outer frame 10 via the provided devices 100 in a snap-fit configuration when the outer frame 10 is appropriately supported to the wall 30. The window pane 50 is coupled in the above described manner to the outer frame 10 to form the window 1.

The illustrated embodiment further comprises several cover elements 70 covering the functional components of the above described system on the one hand to protect the respective components from environmental influences such as dust and/or direct sunlight and on the other hand to obtain an attractive and clear appearance of the overall system.

Figure 4A:
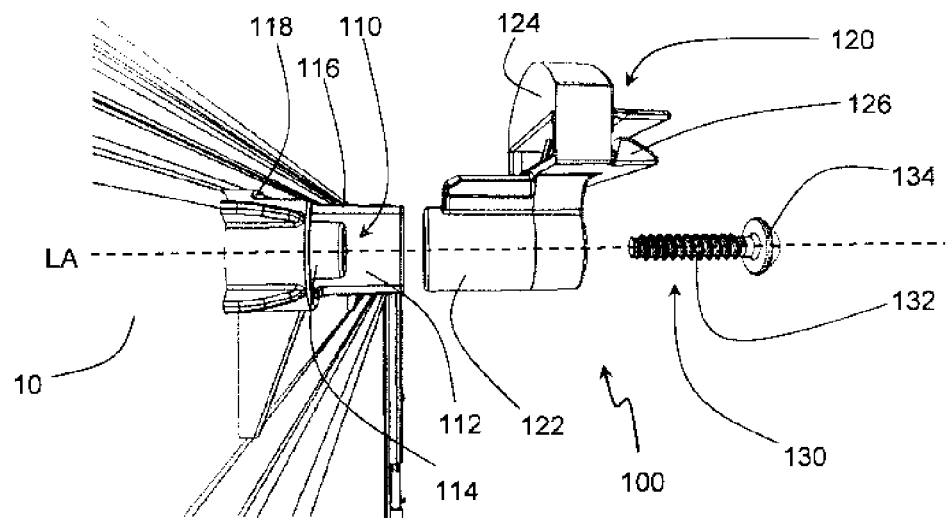
FIG. 4A is a spatial explosion illustration of the device of FIGS. 1A to 3.
Figure 4B:
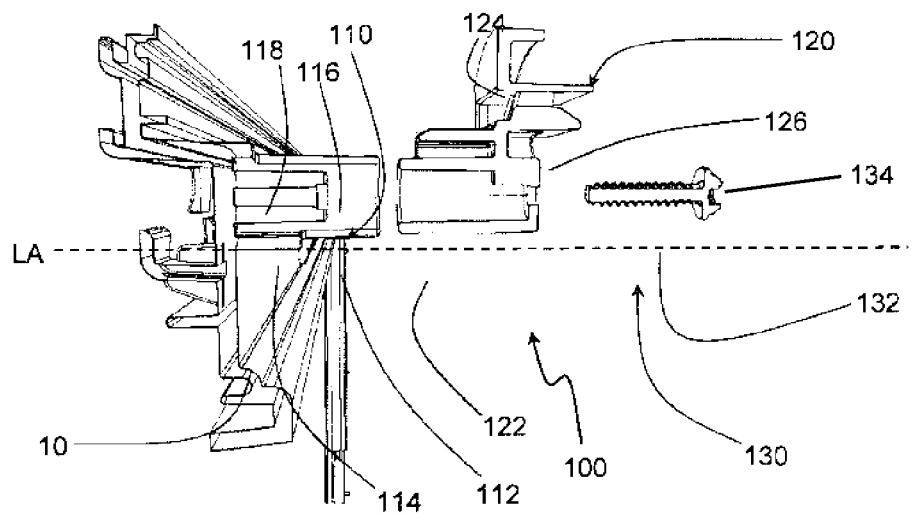
FIG. 4B is a spatial cross-section explosion illustration of the device of FIGS. 1A to 4A.

In the following, while referring to FIGS. 3 to 4B the concrete configuration of the provided devices 100 according to the present embodiments will be described in more detail.

Each of the provided devices 100 for supporting the frame 10 in the opening 32 comprises a guiding body 110, a clamping body 120 and a fixing member 130. The guiding body 110 is configured to be attached to the frame 10. Here the guiding body 110 is formed integrally with the outer frame 10. However, also configurations in which the guiding body is coupled to the frame 10 via separate fastenings are possible. Each clamping body 120 has a tubular coupling portion 122, a clamping portion 124 and a fastening element 126. The fastening element 126, which in the present embodiment is provided on the coupling portion 122, is configured to be engaged with the snap-in elements 22 provided on the other frame 20. The guiding body 110 has a receiving region 112 configured to accommodate at least partly the coupling portion 122 of the clamping body 120 such that the coupling portion 122, and thus the whole clamping body 120, can be moved along a longitudinal axis LA of the coupling portion 122 with respect to the guiding body 110, and such that the coupling portion 122, and thus the whole clamping body 120, can be rotated with respect to the guiding body 110 about the longitudinal axis LA. The coupling portion 122 is movable with respect to the guiding body 110 along the longitudinal axis LA between a first position and a second position. In the second position the coupling portion 122 is inserted into the guiding body 110 up to a larger depth than in the first position. The fixing member 130 has a threaded portion 132 and a head portion 134. The fixing member 132 is configured to be engaged in a screwable fashion with a counter element 114 provided in the guiding body 110 such that the head portion 134 limits the transverse movement of the coupling portion 122 of the clamping body 120 with respect to the guiding element 110 along the longitudinal axis LA. A longitudinal axis of the fixing member 130 is aligned with the longitudinal axis LA of the coupling portion 122. The fixing member 130 can be screwed, for example by using an appropriate tool engaging with a corresponding engaging region provided on the head portion 134 of the fixing member 130, with its threaded portion 132 into and out of the counter element 114 between a first locking position and a second locking position. In the second locking position the fixing member 130, in particular its threaded portion 132, is screwed into the counter element 114 up to a greater depth than in the first locking position. When the fixing member 130 is in the first locking position, the longitudinal movement of the coupling portion 122 with respect to the guiding body 110 is restricted to a range between the first position and the second position of the coupling portion 122 with respect to the guiding body 110. When the fixing member 13 is in the second locking position, the coupling portion 122 is forced by the head portion 134 of the fixing member 130 into the second position of the coupling portion 122 with respect to the guiding body 110. Moreover, the guiding body 110 comprises a stop 116 limiting the rotational movement of the clamping body 120 about the longitudinal axis LA.

Although not illustrated here, the device 10 further can have a biasing member, like for example a spring or a similar member, biasing the clamping body 120 towards the head portion 134 of the fixing member 130 such that the clamping body 120 always rests against the head portion 134 of the fixing member 130.

In the illustrated embodiment, the clamping body 120 further comprises a limiting projection 128 and the guiding body 110 comprises a corresponding further stop 118. In the present embodiment, the further stop 118 is in the form of a recess provided in the guiding body 110. The limiting projection 128 and the further stop 118 are configured to block a rotational movement of the clamping body (120) about the longitudinal axis LA when moving along the longitudinal axis LA with respect to the guiding body. This is in particular the case when the coupling portion 122 is in the second position relative to the guiding body 110. Thus, a proper and reliable attaching and detaching process of the device 100 to and from the wall is ensured, as substantially the rotational movement of the clamping body 120 about the longitudinal axis LA is separated from the longitudinal movement of the clamping body 120 with respect to the longitudinal axis LA.

In the following, the concrete function of the above described devices 100 is described with reference to FIGS. 5A to 6B as well as FIGS. 2A and 2B for an installation process of the frame 10 in the wall opening 32 within the wall 30.

At first, the clamping body 120 is in an initial configuration with respect to the guiding body 110. In the initial configuration the coupling portion 122 is in the first position with respect to the guiding body 110 and in a first rotational orientation with respect to the guiding body 110 such that the clamping portion 124 of the coupling body 120 points inwards (i.e. towards the opening within the frame 10). In other words, such that the clamping portion 124 of the clamping body 122 does not overlap with the counter surface(s) 12 of the frame 10 seen along the longitudinal axis LA. In the initial configuration, the fixing members 130 are in the first locking position with respect to the guiding body 110.

Figure 5A:
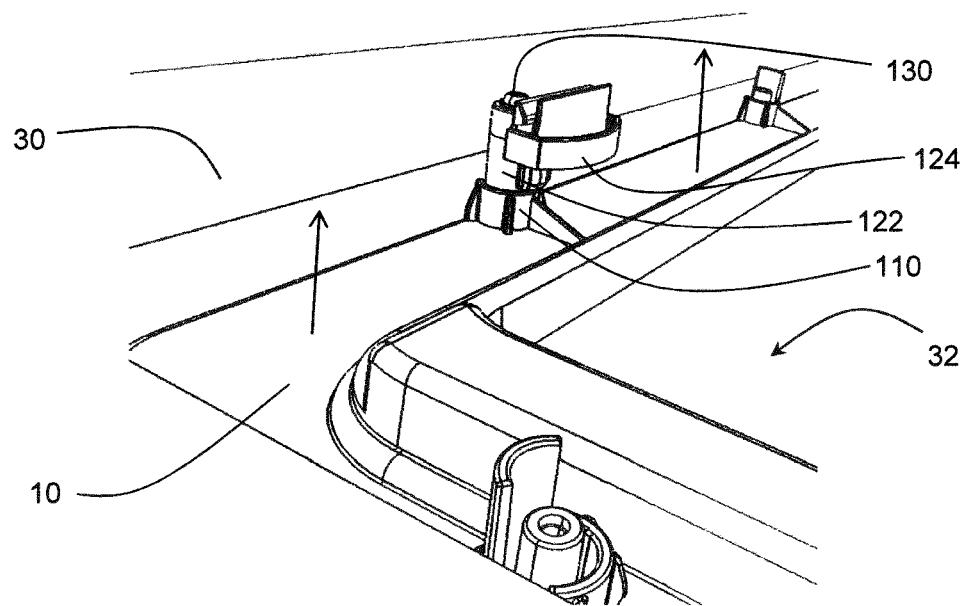
FIGS. 5A and 5B are enlarged spatial views of the device of FIGS. 1 to 4B during a first phase of an installation process of the frame.
Figure 5B:
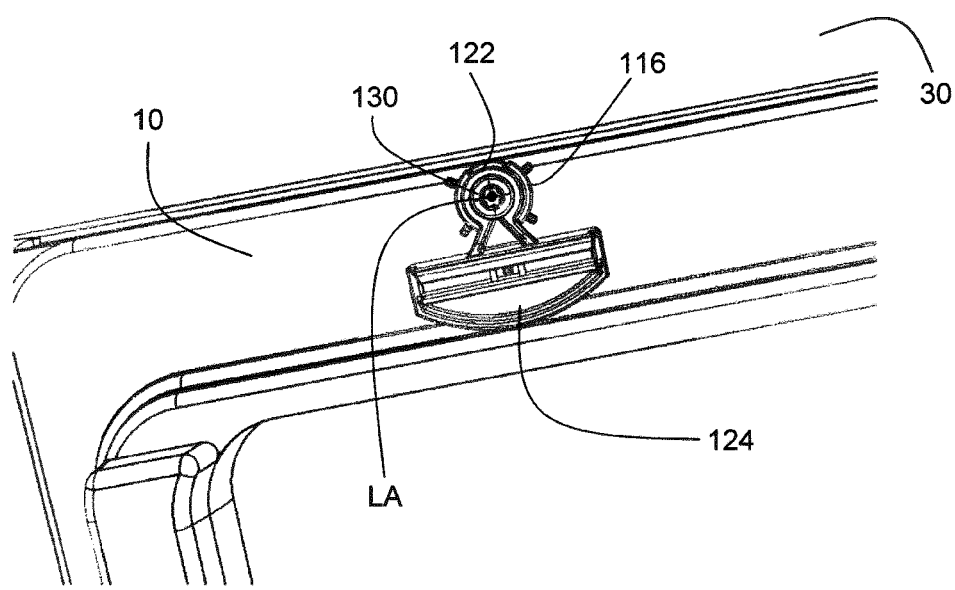
Figure 6A:
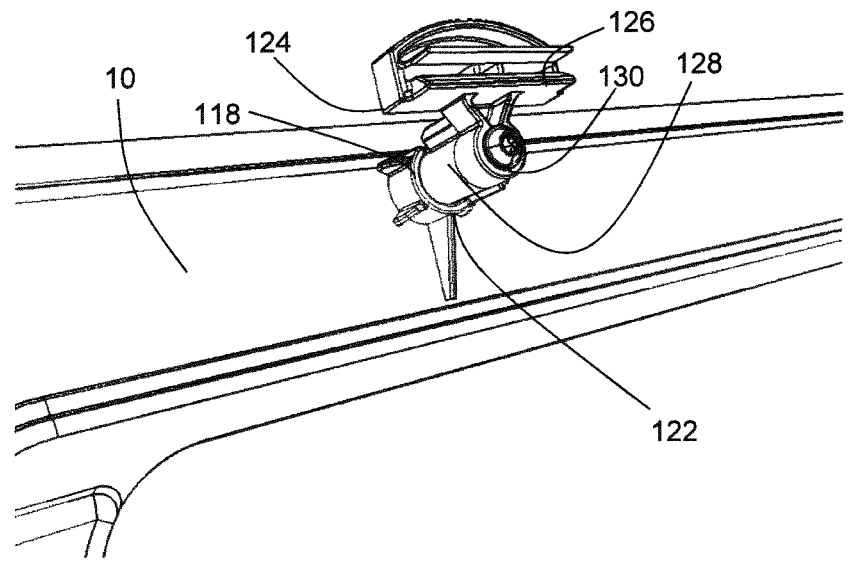
FIGS. 6A and 6B are enlarged spatial views of the device of FIGS. 1 to 5B during a second phase of the installation process of the frame.
Figure 6B:
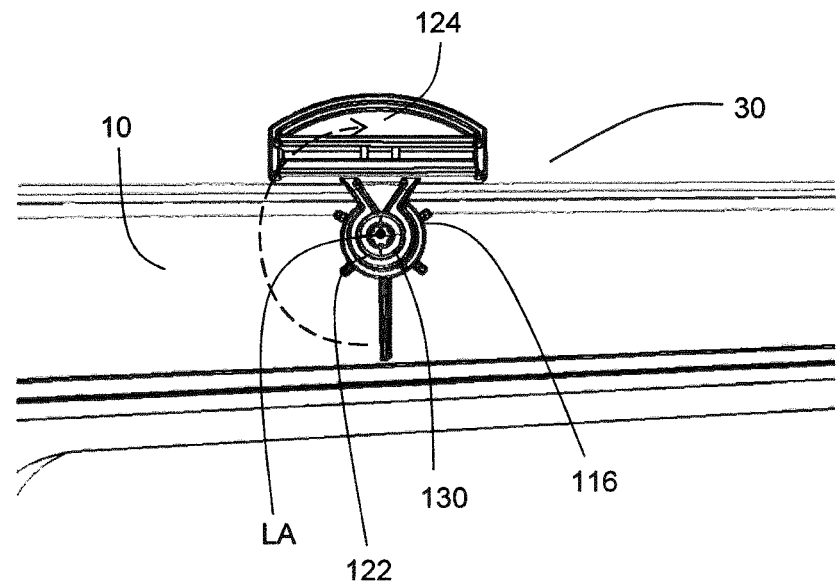

The frame 10 with the devices 100 attached thereto is arranged within the wall opening 32 provided in the wall 30 such that the counter surface(s) 12 of the frame 10 rests along the edges of the wall opening 32 on one side of the wall 30 and such that the clamping portions 124 of the devices 100 are positioned on the other side of the wall 30 with respect to the expansion plane of the wall 30 (see FIGS. 5A and 5B).

Then, for example by use of an appropriate tool engaging a corresponding engaging region provided on the head portions 134 of the fixing members 130, the fixing members 130 are screwed via a rotational movement of the fixing members 130 about the longitudinal axes of the fixing members 130 corresponding to the longitudinal axes LA of the coupling portions 122 of the clamping bodies 20 into the provided counter elements 114. In response thereto, due to frictional effects, at first the coupling portions 122 and thus the clamping bodies 120 rotate about the longitudinal axes LA until the stops 116 block the further rotation of the coupling portions 122 about the longitudinal axes LA in a configuration, in which the clamping portions 124 of the clamping bodies 120, in particular completely overlap with the corresponding counter surface(s) 12 seen along the longitudinal axis LA (see FIGS. 6A and 6B).

As the provided stops in from of the counter surface(s) 12 prevent further rotational movement of the coupling portions 122 about the longitudinal axes LA, a further screwing-in process of the fixing members 130 results in a movement of the coupling members 122, and thus of the whole clamping bodies 120, along the longitudinal axes LA towards the second positions, i.e. towards the wall 30 and the counter surface(s) 12, and thus in clamping the wall 30 at the edges of the wall opening 32 between the clamping portions 124 of the provided devices 100 and the corresponding counter surface(s) 12 of the frame 10. At the same time, the provided limiting projections 128 of the clamping bodies 120 are engaged with the corresponding further stops 118 preventing any rotational movement of the coupling portions 122, and thus of the clamping bodies 120, with respect to the guiding bodies 110 such that the clamping bodies 120 at first have to be lifted a specific distance from the guiding bodies 110 before the clamping portions 124 can rotate towards an orientation misaligned with respect to the edges of the wall 30 and/or the counter surface(s) 12.

The screwing-in process is finished as soon as the wall 30 is clamped with the desired and/or necessary clamping force between the clamping portions 124 of the clamping bodies 120 and the counter surface(s) (see FIGS. 2A and 2B). This is the case when the threaded portions 132 of the fixing members 130 are screwed into the counter elements 114 in a specific screw-in depth. The specific screw-in depth depends in particular form the thickness of the wall 30 at the edges around the wall opening 32 and the desired clamping force. According to the present embodiments, it is possible to support a frame 10 having standardized devices 100 to walls 30 of various thicknesses and with various clamping forces. In addition, the desired clamping force can be restored easily by further screwing in (i.e. tightening) the fixing members 130 into the counter elements 114 when, due to material fatigue, the clamping force has decreased. Thus, no replacement of the provided devices is necessary which saves workload and costs.

To finish the installation process of a corresponding window, in a last step, an appropriate window panel 50 and/or another frame 20 is coupled to the frame 10. In particular, the window panel and/or the other frame 20, like in the illustrated embodiment, is coupled via corresponding snap-in elements in a snap fit configuration to the devices 100, as is illustrated in FIG. 3.

To disassemble the window 1 or the frame 10, respectively, the steps have to be carried out in a reverse order. As for the skilled artisan the disassembling operation thus is clear in light of the above description, a detailed description of this operation is omitted here.

Although the above described embodiment of the present embodiments depict one implementation, several adaptions can be carried out for the disclosed set up without departing from the scope of protection of the accompanying claims.

The material of the devices 100 and/or of the frames 10, 20 can be any appropriate material. However, in particular various plastic material like for example polymers or metal material like for example aluminum are preferred materials due to their resistivity and lightweight.

Even if the above embodiment refers to a configuration in which the frame is supported to a side wall opening 32, the opening to which the above described frame is supported can be an opening in a roof area or even an opening in a floor area of the recreational vehicle as well. Hence, the present embodiments are not limited to a specific opening but can be applied to any opening of the recreational vehicle in this regard.

Examples for functional elements, other than the extendable sunshield, which can be provided in a correspondingly provided receiving section are various sensors, like for example sensors for determining a temperature, the current status of the window, i.e. whether the window is opened or closed and/or respectively locked or unlocked, or other relevant information, and/or, in particular remote controlled, driving components configured to open and/or to close as well as for example to lock and/or to unlock the window.

Here, twenty devices 100 for supporting the frame 100 in the wall opening 32 are provided, wherein on each of the upper crossbar 14 and the lower crossbar 16 of the frame 10 seven devices 100 are attached uniformly distributed, and on each of the two provided side crossbars 18 three devices 100 are attached uniformly distributed. However, also other configurations with less devices 100, like for example two or four devices 100, or configurations with even more devices 100 can be implemented. The concrete number of provided devices 100 is mainly dependent on the size and the weight of the frame 10 as well as the concrete structure of the provided devices 100.

In the above described embodiment, the frame 10 is a so-called adapter frame. In other words, the frame 10 is a frame configured to support another frame 20 and/or a window pane 50 in the opening 32. Although in the illustrated embodiment, the fastening elements 126 for coupling the other frame 20 to the frame are provided on the clamping bodies 120 of the devices 100, the fastening elements 126 also can be formed directly on the frame 10 or on other elements of the devices 100 like on the guiding bodies 110.

The core idea of the present invention is to provide a device 100 and a corresponding method enabling the attachment of the frame 10 to the wall 30 via one single rotational movement of one component 120 of the device 100, and this for a variable thickness of the wall 30.

As for example illustrated in FIG. 2A, the various devices 100 can have various implementations for the clamping portion 124 or of other components of the device.

REFERENCE NUMERALS 1 window
10 outer frame (frame)
12 counter surface
14 upper crossbar
16 lower crossbar
18 side crossbar
19 fastening element
20 inner frame (other frame)
22 snap-in element
30 wall
32 wall opening
40 extendable sunshield (functional element)
42 guiding frame
44 coupling member
46 blackout fabric
48 handle rail
50 window pane
52 glass plate
54 window frame
60 operating and/or locking member
70 cover element
100 device
110 guiding body
112 receiving region
114 counter element
116 stop
118 further stop
120 clamping body
122 coupling portion
124 clamping portion
126 fastening element
128 limiting projection
130 fixing member
132 threaded portion
134 head portion
LA longitudinal axis

The invention claimed is:

1. A device for supporting a frame in an opening of a recreational vehicle, comprising:
a guiding body configured to be attached to the frame;
a clamping body having a tubular coupling portion and a clamping portion; and
a fixing member having a threaded portion and a head portion;
the guiding body having a receiving region in which the tubular coupling portion of the clamping body is inserted such that the tubular coupling portion is movable along a longitudinal axis of the tubular coupling portion between a first position and a second position relative to the guiding body and rotatable about the longitudinal axis of the tubular coupling portion relative to the guiding body,
the guiding body having at least one stop which limits rotation of the tubular coupling portion about its longitudinal axis relative to the guiding body,
wherein the fixing member engages via the threaded portion into a counter element provided in the guiding body so as to be screwable in and out, and is connected to the guiding body in such a way that the head portion limits movement of the tubular coupling portion of the clamping body along the longitudinal axis of the tubular coupling portion relative to the guiding body;
wherein in a first locking position relative to the guiding body the fixing member restricts movement of the tubular coupling portion along its longitudinal axis to a range between the first position and the second position, and in a second locking position the fixing member forces the tubular coupling portion into the second position.

2. The device of claim 1, wherein
the clamping body further comprises a limiting projection which interacts with a further stop formed on the guiding body such that the clamping body is guided longitudinally along the guiding body when moving along the longitudinal axis of the tubular coupling portion and by that any rotation of the tubular coupling portion relative to the guiding body is blocked during movement of the clamping body along the longitudinal axis of the tubular coupling portion.

3. The device of claim 2, wherein
the further stop is formed as a recess in the guiding body and the further stop is designed to receive the limiting projection of the clamping body.

4. The device of claim 1, wherein the clamping body, in particular at the clamping portion, has at least one fastening element which is designed in such a way that one of another frame or a window pane can be fastened via the at least one fastening element to the device, wherein this is realized in particular via a snap fit between the at least one fastening element and at least one corresponding snap-in element provided on the other frame and/or on the window pane.

5. The device of claim 1, further comprising a biasing member which biases the clamping body towards the head portion of the fixing member such that the clamping body always rests against the head portion of the fixing member.

6. A frame for a window of a recreational vehicle comprising at least two devices fixed to the frame in such a way that by screwing a fixing member into a corresponding counter element at edges of a wall around a corresponding opening can be clamped between clamping portions of a device and a counter surface formed on the frame, so as to support the frame in the opening;
wherein a guiding body of at least one of the at least two devices and the frame is formed integrally and the guiding body of at least one of the at least two devices is fastened to the frame via separate fastenings.

7. A frame for a window of a recreational vehicle comprising at least two devices fixed to the frame in such a way that by screwing a fixing member into a corresponding counter element at edges of a wall around a corresponding opening can be clamped between clamping portions of a device and a counter surface formed on the frame, so as to support the frame in the opening;
wherein the frame is an adapter frame configured to support a window pane and/or another frame in the opening wherein the frame comprises in particular at least one fastening element adapted so that the other frame and/or window pane can be fastened thereto, in particular via snap fit between the at least one fastening element and at least one corresponding snap-in element provided on the other frame and/or on the window pane.

8. The frame of claim 7, wherein
the frame has at least one receiving section in which an extendable sunshield and/or other functional element is/are or at least can be provided.

9. A method for supporting a frame in a wall opening in a recreational vehicle the steps of:
positioning the frame in the wall opening, and
aligning as well as tightening at least one provided device for supporting the frame in the wall opening with one single rotational movement of at least one component of the at least one provided device, such that edges of a wall around the wall opening are clamped between the at least one provided device and the frame;
wherein at least one of the at least one provided device corresponds to the other of the one of the at least one provided device, and wherein in particular the aligning and tightening consists of screwing a fixing member of the at least one provided device into a corresponding counter element of a guiding body so as to clamp the wall at the edges of the wall opening between a clamping portion of a clamping body and a counter surface provided on the frame.

10. The method of claim 9, wherein
the screwing consists of screwing in the fixing member from a preset first locking position to a second locking position only so deep that the wall is clamped at the edges of the wall opening with a desired clamping force.

11. The method of claim 9 further comprising the step comprising any method
fastening a window pane and/or another frame with a window pane fastened therein/thereon to the frame.

12. The method of claim 11, wherein
the fastening is effected via snap fit between fastening elements provided on the frame and/or on the at least one provided device, and corresponding snap-in elements provided on the other frame and/or on the window pane.

* * * * *